United States Patent Office
3,360,008
Patented Dec. 26, 1967

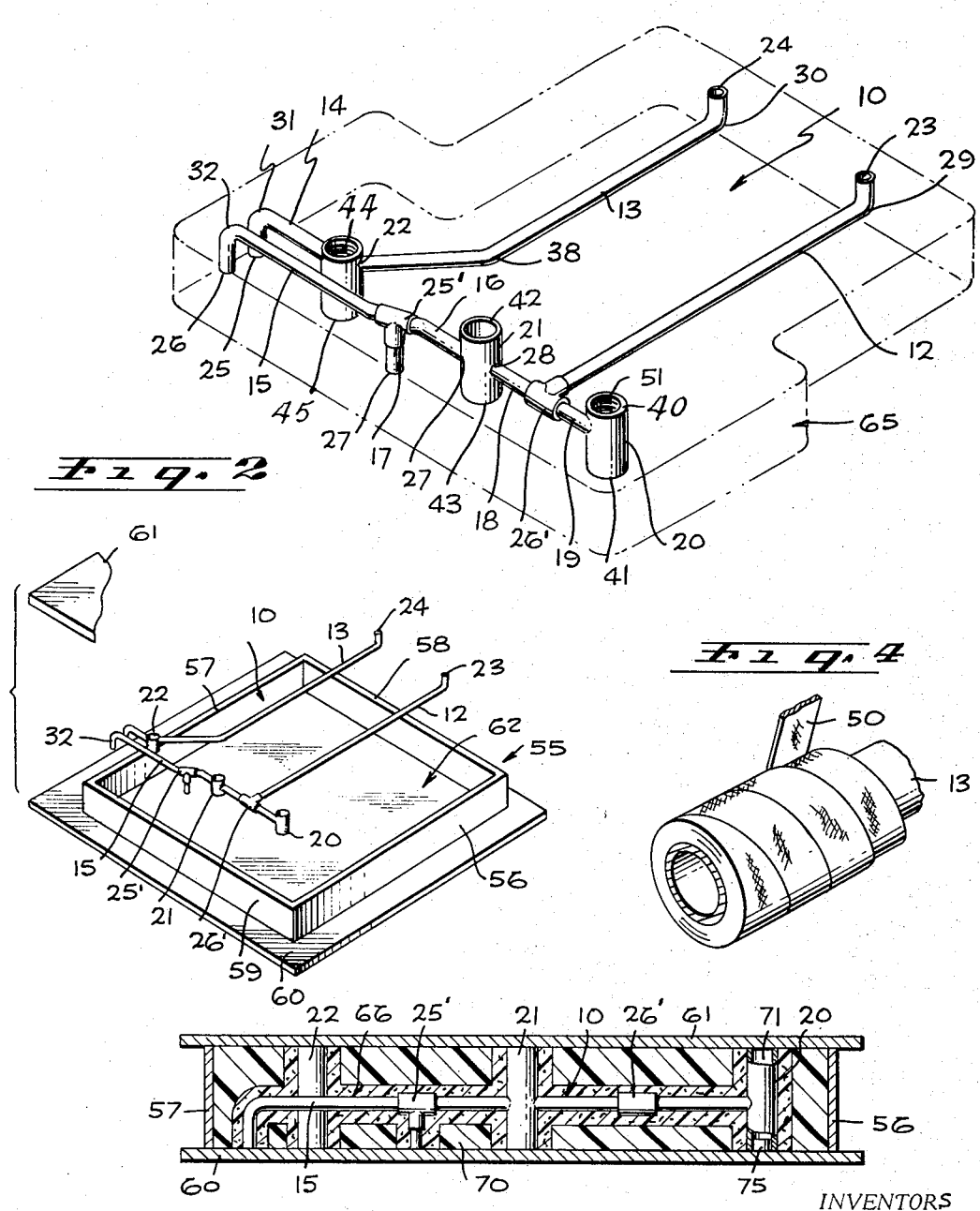

3,360,008
MOLDED MANIFOLD CONSTRUCTION AND METHOD OF FORMING
Frank A. Papale, Lodi, and Robert W. Childers, Tranquility, N.J., assignors to Raymond International Inc., New York, N.Y., a corporation of New York
Filed Oct. 7, 1964, Ser. No. 402,310
12 Claims. (Cl. 137—594)

ABSTRACT OF THE DISCLOSURE

The invention relates to a molded manifold construction making use of fiberglass reinforced synthetic plastic resin for encasing tubular fluids lines as a replacement for machined steel castings and a method of making the manifold from metal tubing, fittings, synthetic plastic materials and reinforcing. The disclosure in which the invention is embodied makes use of a form having customary top, bottom and side walls forming a chamber. Tubing, preferably of metal which can be easily bent and requisite fittings, are assembled together separately. The tubing is adjusted so that it extends through the chamber at the same location and in the same directions as would be desired for passages through the manifold. Ends of the tubing are bent and directed outwardly to coincide with the inside surfaces of the surrounding mold structure. Fiberglass fabric impregnated with thermosetting synthetic plastic resin is then wrapped around the tubing and fittings in a desired number of layers and this wrapping ultimately sets up and hardens around the tubing and fittings. The composite wrapped tubing and fittings structure is accurately located in the chamber of the mold and encased or potted in the mixture of thermosetting synthetic plastic resin in which is embodied appropriate fillers. After the final set has taken place the mold is removed and, if need be, holes are cleared into the tubing.

---

The most common expedient heretofore employed in constructing a manifold block for hydraulic lines carrying high pressure has been a steel block with the passages drilled from various directions in order to meet the demands of a particular manifold. For manifolds necessitating a more complex hydraulic passage system the prior art has resorted to machining two or more manifold blocks with complementary interconnecting hydraulic passage ways, machining the mating surfaces of complementary blocks and then silver soldering the mating faces of the block together in order to form a composite structure.

It is quite natural that a complex manifold block constructed in this fashion is very high priced. Machining operations are costly. Steel is expensive and if the machining is not precisely performed either the resulting composite block performs poorly or is difficult to assembly or the poorly formed part must be thrown away and a new one made. A great many man hours is involved in making even the simpler manifold blocks and as a consequence the time involved in filling orders to specification for manifold blocks machined in this fashion is considerable.

It is therefore among the objects of the invention to provide a new and improved manifold construction making use of a tubing encased in a special fashion with reinforced synthetic plastic resin material which meets all of the requirements of machined steel manifold blocks heretofore available but which is exceedingly low in cost, light in weight, and capable of withstanding hydraulic pressures which in many instances may exceed pressures possible with the use of machined steel castings of the type heretofore available.

Another object of the invention is to provide a new and improved manifold construction of reinforced synthetic plastic resin material and tubing which is possessed of superior hydraulic flow properties, minimizing turbulence and friction, and wherein intricate pattern and systems of passages and ports are possible to fit virtually any circumstance without it being necessary to add to the low cost made possible for a manifold construction of this kind.

Still another object of the invention is to provide a new and improved reinforced synthetic plastic manifold construction making use of a tubing for hydraulic passages therethrough wherein a minimum number of seconds is encountered in the manufacturing process and where workmen of no more than modest skill are capable of constructing such manifolds quickly and easily and in virtually any form, size and passage pattern, the resulting manifold being capable of withstanding exceedingly high pressures and also being readily adapted for connection to conventional hydraulic piping.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a side perspective view of a system of tubing forming the hydraulic passages in a manifold block with a typical manifold block shown in broken lines around the system of passages.

FIGURE 2 is a side perspective view of the tubing interconnected to form the system of passages shown in the relationship it would have to a mold cavity employed to encase the tubing in the manifold block material.

FIGURE 3 is a typical cross-sectional view of the finished manifold block prior to removal of the mold.

FIGURE 4 is a fragmentary perspective view showing a typical section of tubing in the course of being reinforced with fiberglass reinforced plastic material prior to encasement in a mold block.

The invention here under consideration consists not only of an improved manifold construction but comprehends also a method of making the manifold. Although a typical passage system is disclosed, it will be understood that the disclosure of both the product and the method is primarily by way of example of what has been found to be especially acceptable form of the device capable of meeting extremely high pressure specifications.

In the embodiment there is shown a system of passage ways in a tubing assembly indicated generally by the reference character 10. The assembly is made up of a series of individual tubing lengths herein identified by the reference characters 12, 13, 14, 15, 16, 17, 18, and 19, these, purely by way of example, being of substantially the same diameter. Also in the assembly are tubing sections or lengths 20, 21 and 22 of relatively larger diameter. The tubing, whether of smaller or larger diameter, is as a matter of preference copper tubing which can be easily bent, worked, and connected with fluid tight joints. Joints may be made by employment of fittings like the fitting 25' which interconnects tubing lengths 15, 16, and 17 and the fitting 26' which interconnects the tubing lengths 12, 18, and 19. Joints which have been found satisfactory are sweated joints where the connection between the tubing length and the fitting is a soldered or sweated joint making use either of conventional solder, silver solder or other appropriate metal to metal connection.

Where tubing lengths of relatively smaller diameter are joined to tubing lengths of relatively larger diameter as for example where tubing lengths 16 and 18 are joined to the tubing length 21, joints like the joints 27 and 28 may be welded joints.

Although the tubing length 17 protrudes outwardly from the fitting 25' by means of which it is located with respect to the tubing assembly 10 attention is directed to sections 29, 30, 31 and 32 which is each a right angle bend in the tubing length itself. These bends terminate respectively in ports 23, 24, 25, and 26. The tubing length 17 may be said to terminate in a port 27. Although right angle bends have been made reference to it will be appreciated that virtually any bend may be made in tubing of this kind so that the portion of the tubing terminating in the respective port can be directed outwardly in virtually any direction to coincide with virtually any face of the ultimate manifold block which will be provided. Attention is also invited to a bend 38 in the tubing length 13 which makes it possible to reach the port 24 from the tubing length 22 through a flow path or passage in which there are no sharp turns or angles to impede the smooth flow of high pressure fluid. Inasmuch as tubing such as copper tubing is proposed tubing of this kind can be bent in many directions with smooth flowing gentle bends of virtually any number thereby making it possible to fashion the tubing length in virtually any desired pattern with considerable ease such as is experienced in the use of tubing of this nature.

Tubing sections or lengths 20, 21, and 22 in the chosen embodiment are indicated as terminating respectively in ports 40, 41, 42, 43, and 45.

Although copper tubing has been suggested as a preference it will be understood and appreciated that virtually any relatively thin walled tubing may be employed such as brass tubing, aluminum tubing, and stainless steel or in fact steel tubing, the material chosen for a specific installation being a material compatible with the fluids being handled and the type of joint possible between respective sections of tubing. Moreover although metal tubing has been refererred to first in preference it will be understood that for certain types of installations tubing of one or another of the commercially available synthetic plastic resin materials can also be employed. In the last instances where the tubing may be such that it does not take any set when bent into a desired position the tubing may be temporarily held to a satisfactory degree by locating the ports by employment of mandrels on some fixed support much in the same fashion as drill bushings are located when they are to be encased in an appropriate plastic drill block. Since it is only the ports which must be precisely positioned it is not of great moment how precisely the tubing length follows any one or another of a selected number of paths from one port to another or from a port to some connection within the tubing assembly.

After the tubing lengths have been connected together into the tubing assembly 10 so that the ports are precisely positioned at desired locations the tubing is encased in a reinforced wrapping. This is preferably accomplished by impregnating strips of fiberglass fabric like the strip 50 with a synthetic plastic resin material and an appropriate curing system and the strip then wrapped around a length of tubing like the tubing length 13 of FIGURE 4 while the synthetic plastic resin material is still wet and non-hardened. Where the usual high pressures are expected, multiple layers of the stirip 50 are applied thereby to build up a thickness of resin impregnated fiberglass fabric around the exterior of the tubing to a thickness of from one half inch to as much as two inches on some occasions, depending primarily upon pressures which will be encountered. Great tensile strength is added by employment of a fiberglass fabric where the fibers are laid around the circumference of the tubing either by winding or wrapping in some other appropriate fashion especially where the fibers are set in the synthetic plastic resin material. For best results all of the tubing lengths, fittings, and connections in the assembly are similarly encased by wrapping or otherwise in the resin impregnated fiberglass fabric, the lengths being so encased all the way out to the ports, and especially where ports may incorporate threaded connections like the threaded connection 51 of the port 44.

In the handling of resin impregnated fiberglass fabric in wet condition there is invariably an overage of the liquid plastic resin material wherever sufficient material is used to complete filling of the interstices in the fabric material, which is necessary in order to get a completely solid mass of reinforcement of the kind described around all portions of the tubing assembly. Rag ends of the fabric will project beyond the ports and quantities of the plastic resin material will flow in unwanted droplets around the ports. This however presents no problem which cannot be handled in that after there has been an initial set in the plastic resin in the normal course of its hardening the plastic impregnated fabric around the ports can be neatly cut off before a final set takes place or if the material has hardened appreciably it can be planed or sanded off to make certain that the passage ways in the tubing assembly remain clear. Appropriate plugs may be placed in each of the ports prior to the application of the resin impregnated fabric. The plugs can be allowed to remain in place while the partially hardened resin impregnated fabric is trimmed around the ports and the plugs trimmed at the same time and by the same operation, later to be removed when the application of the resin material has been completed.

In order to make an appropriate manifold block for the handling of the tubing assembly there may be provided a mold box indicated generally by the reference character 55 and consisting of side walls 56 and 57, end walls 58 and 59, a bottom wall 60, and a cover 61. The walls encompass a mold cavity 62. The shape, size and thickness of the mold box and the resulting mold cavity is tailored to the tubing assembly and the machinery or ither apparatus with which the resulting manifold block is to be used. A block 65 is suggested in FIGURE 1 having a special construction along its sides and presenting upper and lower flat surfaces. In order to simplify explanation the mold box 55 and mold cavity 62 as shown in FIGURES 2 and 3 are made rectangular. The height of the side and end walls is made such as to conform to the length of the tubing sections 20, 21, and 22. Ports 23 and 24 extend to such a location that they coincide with the plane of the ports 40, 42, and 44. On the opposite side the ports 25, 26, and 27 are extended outwardly so that they coincide with the plane of the ports 41, 43, and 45. In the last instance, this plane is coincident with the inside face of the bottom wall 60. The plane encompassing the ports on the opposite side is coincident with the inside face of the cover 61. It will be understood, of course, that this is by way of example only and that ports may extend outwardly toward the side walls if necessary for some particular design of mold block or may be stepped at different levels on opposite faces should that be a requirement. Further still because the molding process need not be undertaken under great pressure the mold box can be adjusted and readjusted at will in order to meet virtually any specifications with respect to the ultimate size and configuration of the manifold block and the tubing, being bendable, can be readily and freely readjusted to suit virtually any circumstance.

To effectively impregnate the fiberglass fabric strip 50 as heretofore mentioned the synthetic plastic resin material with an appropriate hardener is customarily used clear and free of a filler of any kind. The multiple layers of impregnated fabric after application provide a wall 66 of the desired thickness of between one half inch and about two inches over all of the tubing in the tubing assembly as shown in FIGURE 3. When this hardens it becomes a substantially homogeneous coating over the entire tubing assembly having relatively great tensile strength to resist any tendency of the tubing to expand under pressure during use and also to resist leaks which the pressure might engender, either at the joints or througout the tubing.

Although certain types of epoxy resins have been found most desirable it will be understood that the product and the process may be practiced with a number of commercially available synthetic plastic resin materials used with an appropriate hardener. One such material used with considerable success is Bisphenol "A" epichlorohydrin type, this being available from many sources. It is a common type of epoxy resin. Other liquid epoxy resins have also been found satisfactory as well as other synthetic plastic thermosetting resin materials. The latter may be of the polymerizing type or the condensation reaction type or appropriate modifications of either of these. They are identified in the trade as urethanes and polyesters, the latter comprising styrenes, diallyl thalates, and the acids. Among the condensation products are phenolics, ureas, melamines, and furfurals, when appropriately handled.

To effect a proper cure the curing system should be matched to the selected resin. By way of example it has been found that for the liquid epoxy resin of the types specifically identified above a good curing system may be an aliphatic amine polyamid or an acid anhydride. A curing system found especially effective is Shell RTH and RTA, this being a combination which cures at room temperature with a very small amount of shrinkage.

When the manifold block is to be cast about the tubing assembly 10 the tubing assembly is placed in the mold cavity 62 where it may be staked in place by suitable positioning pegs (not shown) which may extend part way into the sundry ports. A mixture is then made of an appropriate synthetic plastic resin material and a suitable filler. The resin material for the block may be selected from the same group as has been described in detail in connection with the resin material for the impregnation of the fiberglass fabric. Although the material for the filler is not critical certain fillers have been found more appropriate than others. Satisfactory fillers include aluminum oxide, aluminum silicate, asbestos, iron oxide, mica, coke, coal, calcium carbonate, clay, and talc. It is important however that the filler selected be compatible with resins and particularly epoxy resins. The filler is used basically to reduce exotherm, to lower shrinkage, to provide hardness, and to reduce cost. Marked success has been found in using silica flour partly because of its ease of mixing and handling with the epoxy as well as its availability and low cost. Finer grades of flour are found preferable for molding the manifold block to secure greatest strength. Coarse grades lower the strength when used in the manner herein disclosed and for the purposes here involved. Depending to a degree upon the character of the filler selected the range of fineness should be between a degree of fineness capable of passing a 100 mesh screen and capable of being retained upon a 500 mesh screen.

The amount of filler varies appreciably depending upon the type selected and its density. When using silica flour the variation, depending upon the synthetic plastic resin material chosen, may vary throughout a range as low as 25 parts of filler per 100 parts of resin to as high as 300 parts of filler per 100 parts of resin. A very successful ratio is 100 parts of filler to 100 parts of resin, for best pouring viscosity.

Moreover to obtain bubble free castings the usually accepted methods should be followed such as mild heating of the ingredients prior to mixing, careful mixing to reduce air intake to the mixture and the pouring of the mixture into the mold cavity from the bottom of the mixing container. Vaccum casting may also be resorted to in order to further reduce air bubbles in the cast mold block.

Moreover to minimize a large exothermic temperature rise and resulting high shrinkage which is often associated with large castings of the type here undertaken a careful selection of the curing system is advisable. The Shell chemical curing system above referred to employed with silica flour of the consistency described produces very acceptable mixing and hardness characteristics and resulting strength.

The mixture as described herein consisting of synthetic plastic resin material, filler, and an appropriate hardener is then poured into the mold cavity 60 where it becomes a mass 70 when hardened forming a manifold block similar to the block 65 made reference to in connection with FIGURE 1 or a block of other aprrropriate size, shape and configuration. The mass of material flows all around the exterior surfaces of the fabric encased tubing assembly and, depending upon the ultimate use to be made of the manifold block, is applied to achieve a thickness of from about one half inch to about two inches around the exterior of the tubing assembly sections measured from the outermost extremity of the fiberglass fabric application. The dimensions of the mold box 55 in regard to width, length and thickness are adjusted to provide the desired thickness. Vibration applied to the mold box may also be resorted to in order to make certain that the mixture spreads properly over all surfaces of the tubing assembly and finds its way into all portions of the mold cavity.

After hardening has taken place the mass is removed from the mold box and becomes the manifold block. Plugs like the plugs 71, 71' are removed and the assembly is then ready for final inspection testing. Because of the smoothness of the molding operation substantially no machining is needed in order to finish the exterior surface of the manifold block. Should any final trimming or sizing be required it can be accomplished by sanding or other appropriate planing or trimming methods which can be easily performed because of the ability of the hardened plastic material to be cut and because of the relatively thin walled metal tubing sections which are exposed, these being the only portions of the device which are metal. On those occasions where plastic tubing is used any necessary final sanding or trimming is still further simplified.

Manifold blocks constructed as herein disclosed on test have been found to resist pinhole leaks when subjected to hydraulic pressure as high as 8,000 pounds per square inch. Where pressures expected to be encountered may be higher the likelihood of pinhole leaks can be further insured against by the provision of an inner tube seal and on some occasions an outer epoxy seal. Under such circumstances testing to as high as 11,000 pounds per square inch has produced no pinhole effect, by test and also when the manifold block has been made use of as a hammer manifold.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a manifold block for high pressure fluid lines an assembly of interconnected passages comprising a series of individual tubing lengths, captive ends of some of said lengths having fluid tight connections to others of said lengths, free ends of said lengths being at various locations with respect to said assembly, said free ends forming open end elements extending outwardly relative to said assembly, a wrapping of multiple plies of fiberglass fabric around said tubing lengths, said fiberglass fabric having an impregnation of thermosetting synthetic plastic resin, and a mass of initially substantially fluid plastic mixture encasing said assembly and enveloping the impregnated wrapping around said tubing lengths, said mass comprising a finely divided filler material adapted to pass a screen of 100 mesh and to be retained on a 500 mesh screen, said mixture including a binder of thermosetting synthetic plastic resin material substantially equal in volume to the volume of the voids in said filler material thereby filling said voids, said resin material embodying a hardener and being molded in place around said assembly whereby to form the manifold block.

2. In a manifold block for high pressure fluid lines an assembly of interconnected passages comprising a series of individual tubing lengths of selected diameter, captive ends of some of said lengths having fluid tight connections to others of said lengths, free ends of said lengths being at various locations with respect to said assembly, said free ends being bent to form open end elements extending outwardly relative to said assembly, a wrapping of multiple plies of fiberglass fabric around said tubing lengths and said connections to a thickness of not less than the wall thickness of said tubing, said fiberglass fabric initially and during the wrapping of the tubing lengths being substantially impregnated with a filler free thermosetting synthetic plastic resin in uncured condition and substantially filling the mesh of said fabric, and a mass of plastic mixture encasing said assembly and enveloping the fabric around said tubing lengths to a depth of not less than the depth of the impregnated fabric, said mass comprising a filler material of substantially the consistency of flour, and a binder of thermosetting synthetic plastic resin material substantially equal to the volume of the voids in said filler material, a hardener in said resin material, said mixture being molded in place around said assembly whereby to form the manifold block.

3. In a manifold block for high pressure fluid lines an assembly of interconnected passages comprising a series of individual tubing lengths, captive ends of some of said lengths having fluid tight connections to others of said lengths, free ends of said lengths being at various locations with respect to said assembly, said free ends forming open end elements extending outwardly relative to said assembly, a wrapping of multiple plies of fiberglass fabric around said tubing lengths, said fiberglass fabric having an impregnation of substantially clear thermosetting synthetic plastic resin selected from a group consisting of a synthetic plastic liquid epoxy resin, a polymerizing resin, a condensation type resin, a modification of said polymerizing resin and a modification of said condensation type resin, and a mass of plastic mixture enveloping said assembly and covering the wrapping around said tubing lengths, said mass comprising from about 25 to about 300 parts of a filler of solid finely divided material adapted to pass a 100 mesh screen and to be retained on a 500 mesh screen, and one hundred parts of a thermosetting synthetic plastic resin selected from a group consisting of a synthetic plastic liquid epoxy resin, a polymerizing resin, a condensation type resin, a modification of said polymerizing resin and a modification of said condensation type resin, a hardener in said resin, said mixture being molded in place around said assembly whereby to form the manifold block, the exterior surface of said block being in position substantially surrounding extremities of said end elements.

4. In a manifold block for high pressure fluid lines an assembly of interconnected passages comprising a series of individual tubing lengths, captive ends of some of said lengths having fluid tight connections to others of said lengths, free ends of said lengths being at various locations with respect to said assembly, said free ends forming open end elements extending outwardly relative to said assembly, a wrapping of multiple plies of fiberglass fabric around said tubing lengths, said fiberglass fabric having an impregnation of substantially clear thermosetting synthetic plastic resin selected from a group consisting of a synthetic plastic liquid epoxy resin, a polymerizing resin, and a modification of said polymerizing resin, and a mass of plastic mixture enveloping said assembly and covering the wrapping around said tubing lengths, said mass comprising from about 25 to about 300 parts of a filler adapted to pass a 100 mesh screen and to be retained on a 500 mesh screen and selected from a group consisting of silica flour, aluminum oxide, aluminum silicate, asbestos, iron oxide, mica, coke, coal, calcium carbonate, clay, and talc, and one hundred parts of a thermosetting synthetic plastic resin selected from said first group, a hardener in said resin, said mixture being molded in place around said assembly whereby to form the manifold block, the exterior surface of said block being in position substantially surrounding extremities of said end elements.

5. In a manifold block for high pressure fluid lines an assembly of interconnected passages comprising a series of individual tubing lengths, captive ends of some of said lengths having fluid tight connections to others of said lengths, free ends of said lengths being at various locations with respect to said assembly, said free ends forming open end elements extending outwardly relative to said assembly, a wrapping of multiple plies of fiberglass fabric around said tubing lengths, said fiberglass fabric having an impregnation of substantially clear thermosetting synthetic liquid epoxy resin and a mass of plastic mixture enveloping said assembly and covering the wrapping around said tubing lengths, said mass comprising from about 25 to about 300 parts of a finely divided flour capable of passing a 100 mesh screen and of being retained on a 500 mesh screen, and one hundred parts of a thermosetting synthetic liquid epoxy resin, a hardener in said resin, said mixture being molded in place around said assembly whereby to form the manifold block, the exterior surface of said block being in position substantially surrounding extremities of said end elements.

6. In a manifold block for high pressure fluid lines an assembly of interconnected passages comprising a series of individual tubing lengths, captive ends of some of said lengths having fluid tight connections to others of said lengths, free ends of said lengths being at various locations with respect to said assembly, said free ends forming open end elements extending outwardly relative to said assembly, a wrapping of multiple plies of fiberglass fabric around said tubing lengths, said fiberglass fabric having an impregnation of substantially clear thermosetting synthetic plastic resin consisting of Bisphenol "A" epichlorohydrin, and a mass of plastic mixture enveloping said assembly and covering the wrapping around said tubing lengths, said mass comprising from about 25 to about 300 parts of silica flour and one hundred parts of a thermosetting synthetic plastic resin consisting of Bisphenol "A" epichlorohydrin, a hardener in said resin, said mixture being molded in place around said assembly whereby to form the manifold block, the exterior surface of said block being in position substantially surrounding extremities of said end elements.

7. In a manifold block for high pressure fluid lines an assembly of interconnected passages comprising a series of individual tubing lengths, captive ends of some of said lengths having fluid tight connections to others of said lengths, free ends of said lengths being at various locations with respect to said assembly, said free ends forming open end elements extending outwardly relative to said assembly, a wrapping of multiple plies of fiberglass fabric around said tubing lengths, said fiberglass fabric having an impregnation of thermosetting synthetic plastic resin, and a mass of initially substantially fluid plastic mixture encasing said assembly and enveloping the impregnated wrapping around said tubing lengths, said mass comprising a filler material consisting of silica flour with a binder of thermosetting synthetic plastic resin material of the Bisphenol "A" epichlorohydrin type embodying a curing system identified as Shell chemical RTH and RTA combination, said resin material being in volume substantially equal to the volume of the voids in said filler material thereby filling said voids, said resin material being molded in place around said assembly whereby to form the manifold block.

8. In a manifold block for high pressure fluid lines an assembly of interconnected passages comprising a series of individual tubing lengths, captive ends of said lengths having fluid tight connections to others of said lengths, free ends of said lengths being at various different locations with respect to said assembly, said free ends forming open end elements extending outwardly relative to said assembly, a wrapping of multiple plies of fiberglass fabric around said tubing lengths, said fiberglass fabric having an impregnation of substantially clear thermosetting synthetic plastic resin, and hardener therefore with substantially no voids therein, and a mass of plastic mixture enveloping said assembly and covering the impregnated wrapping around said tubing lengths, said mass comprising from 25 to about 300 parts of a filler and 100 parts of a thermosetting synthetic plastic resin material and a hardener therefor, said filler being selected from a group consisting of silica flour, aluminum oxide, aluminum silicate, asbestos, iron oxide, mica, coke, coal, calcium carbonate, clay and talc, said filler being adapted to pass a 100 mesh screen and being adapted to be retained on a 500 mesh screen, said mixture being molded in place around said assembly whereby to form the manifold block, the exterior surface of said block substantially surrounding extremities of said end elements.

9. In a manifold block for high pressure fluid lines an assembly of interconnected passages comprising a series of individual tubing lengths, captive ends of said lengths having fluid tight connections to others of said lengths, free ends of said lengths providing ports at various different locations with respect to said assembly, a wrapping of multiple plies of fiberglass fabric around said tubing lengths to a thickness of from about one half inch to about two inches, said fiberglass fabric having an impregnation of filler free thermosetting synthetic plastic resin with substantially no voids therein, and a mass of plastic mixture encasing said assembly and covering the wrapping around said tubing lengths to a depth of from about one half inch to about two inches, said mass comprising from about 25 parts to about 300 parts of a finely divided filler and one hundred parts of a thermosetting synthetic plastic resin embodying a hardener, said mixture being molded in place around said assembly whereby to form the manifold block, the exterior surface of said block being substantially flush with said parts.

10. A method of forming a manifold block with fluid passages therein comprising joining together a system of relatively thin walled tubing whereby to establish fluid passages and ports therefor, wetting fiberglass fabric with a liquid synthetic plastic resin material including a hardener therefor, encasing said tubing with multiple layers of said fabric, forming a mold cavity to contain said system, placing said system in the mold cavity, preparing a mixture of from 25 to about 300 parts of a filler of finely divided consistency and about one hundred parts of a liquid synthetic plastic resin material including a hardener and then adding said mixture to the mold cavity until the fabric encased tubing of said system is embedded therein.

11. A method of forming a manifold block with fluid passages therein comprising joining together a system of relatively thin walled tubes whereby to establish fluid passages, and ports therefor, saturating fiberglass fabric with a liquid synthetic plastic resin material including a hardener therefor, wrapping said tubes with multiple layers of said fabric while the resin material is in wet nonhardened condition, forming a mold cavity to contain said system, placing said system in the mold cavity with ports of said system facing walls of said cavity, preparing a mixture of from about 25 to about 300 parts of a filler of flour-like consistency and about one hundred parts of a liquid synthetic plastic resin material including a hardener and then adding said mixture to the mold cavity until the fabric covered tubes of said system are embedded therein.

12. A method of forming a manifold block with fluid passages therein comprising joining together a system of relatively thin walled substantially flexible tubing whereby to establish fluid passages and ports therefor, saturating fiberglass fabric strips with a liquid synthetic plastic resin material including a hardener therefor, wrapping said tubing with multiple layers of said fabric strips while the resin material is in wet nonhardened condition to a thickness of from about one half inch to about two inches, forming a mold cavity to contain said system, placing said system in said mold cavity with ports of said system facing walls of said cavity, preparing a mixture of from about 25 to about 300 parts of a filler of flour-like consistency and about one hundred parts of a liquid synthetic plastic resin material including a hardener and then adding said mixture to the mold cavity until the tubing of said system with the exception of the ports thereof is embedded to a depth of from about one half inch to about two inches around the fabric covered tubing.

References Cited
UNITED STATES PATENTS

| | | | |
|---|---|---|---|
| 2,751,237 | 6/1956 | Conley | 285—156 |
| 2,878,038 | 3/1959 | Noland | 285—423 X |
| 2,943,967 | 7/1960 | Simon. | |
| 3,174,158 | 3/1965 | Russell | 137—561 X |
| 3,313,321 | 4/1967 | Keller | 138—149 X |

HENRY T. KLINKSIEK, *Primary Examiner.*

M. CARY NELSON, *Examiner.*